United States Patent [19]

Massie

[11] 4,193,200
[45] Mar. 18, 1980

[54] ENGRAVING MACHINES

[76] Inventor: Lewis E. Massie, Box 79, Solana Beach, Calif. 92024

[21] Appl. No.: 959,907

[22] Filed: Nov. 13, 1978

[51] Int. Cl.² ............................................. B43L 13/10
[52] U.S. Cl. ................................................... 33/25 B
[58] Field of Search ................... 33/25 R, 25 B, 25 C, 33/23 R, 22; 308/63, 65

[56] References Cited

U.S. PATENT DOCUMENTS

| 1,234,808 | 7/1917 | Roy | 308/65 |
| 2,627,658 | 2/1953 | Green | 33/25 R |
| 2,631,375 | 3/1953 | Gleason | 33/25 R |
| 2,652,292 | 9/1953 | Sabee | 308/65 X |
| 2,872,838 | 2/1959 | Vogel | 308/63 X |
| 3,160,956 | 12/1964 | Mercorelli | 33/25 B |
| 3,496,795 | 2/1970 | Dinnendahl | 33/25 B |

*Primary Examiner*—Harry N. Haroian

[57] ABSTRACT

An engraving machine of the pantograph type wherein long life and precision is obtained in plastic or other soft materials by offsetting upper and lower sections of the pantograph arms in a plane perpendicular to the axis of the pivot bores and shafts thus reducing the effective diameter of the bores to correct the shaft to bore fit as a result of wear and manufacturing tolerances.

4 Claims, 4 Drawing Figures

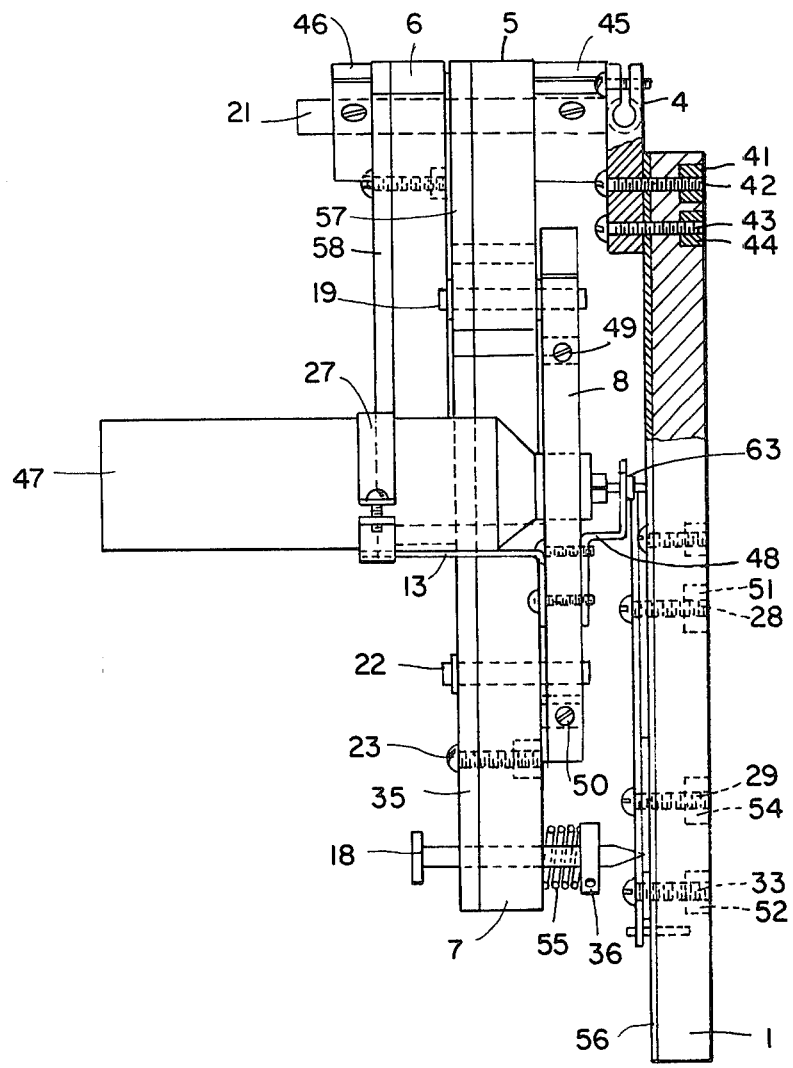
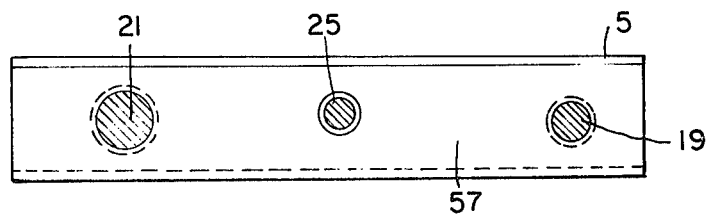

ENGRAVING MACHINES

This invention related to engraving machines of the pantograph type, and has for its object to provide a machine that is light weight, inexpensive and suitable for single dimension or three dimension reproduction from a master copy (pattern, formed surface, illustration or master type) in accurate proportions and with a choice of the scale of reproduction.

Commercially available machines of this type have a useful life that is related to the wear, and subsequent looseness, in the pantograph arm bearings. For this reason these machines are constructed with bearings and shafts machined to close tolerances. Usually the pantograph arm/bearings are constructed of metals selected for resistance to wear or in the case of arms of soft material, metal sleeves are used for the bearing surface. Accordingly, one of the important objectives of my invention is to provide bearings that can be adjusted so as to compensate for wear and to allow wider tolerances in manufacture. This improvement in the design of pantographs allows the use of soft arm materials such as aluminum or molded, or fabricated plastic, thus opening the door to the production of precise, low cost, molded plastic engraving machines.

Another object of this invention is to provide a means for clamping the bearing shaft to one arm of the pantograph while the mating arm has an adjustable bearing for the same shaft.

Another object of this invention is to provide an engraving machine that can accept an electrical rotating motor driven tool, an electric heated burning tool, or a small jet air driven abrasive tool.

Another object of this invention is to provide an improved pantograph structure wherein not only the pivot joints in the pantograph arms have adjustable bearings but the joints for tilting and rotating the pantograph arm assembly can be adjusted for precision fits and low operating friction.

Still another object of this invention is to provide a new and improved pantograph structure assembly where the moving arms, although light in weight, are large to provide long bearings for greater firmness without sacrificing freedom of movement.

While other objects will become apparent as this description progresses is to understand that the invention is not limited in its application to the details of construction and arrangement since the invention is capable of other embodiments.

Other advantages of this invention will appear in the following specification and accompanying drawings in which:

FIG. 2 is a side elevation view partially broken away.

FIG. 4 is a plan view of arm assembly 5.

Figure 1:
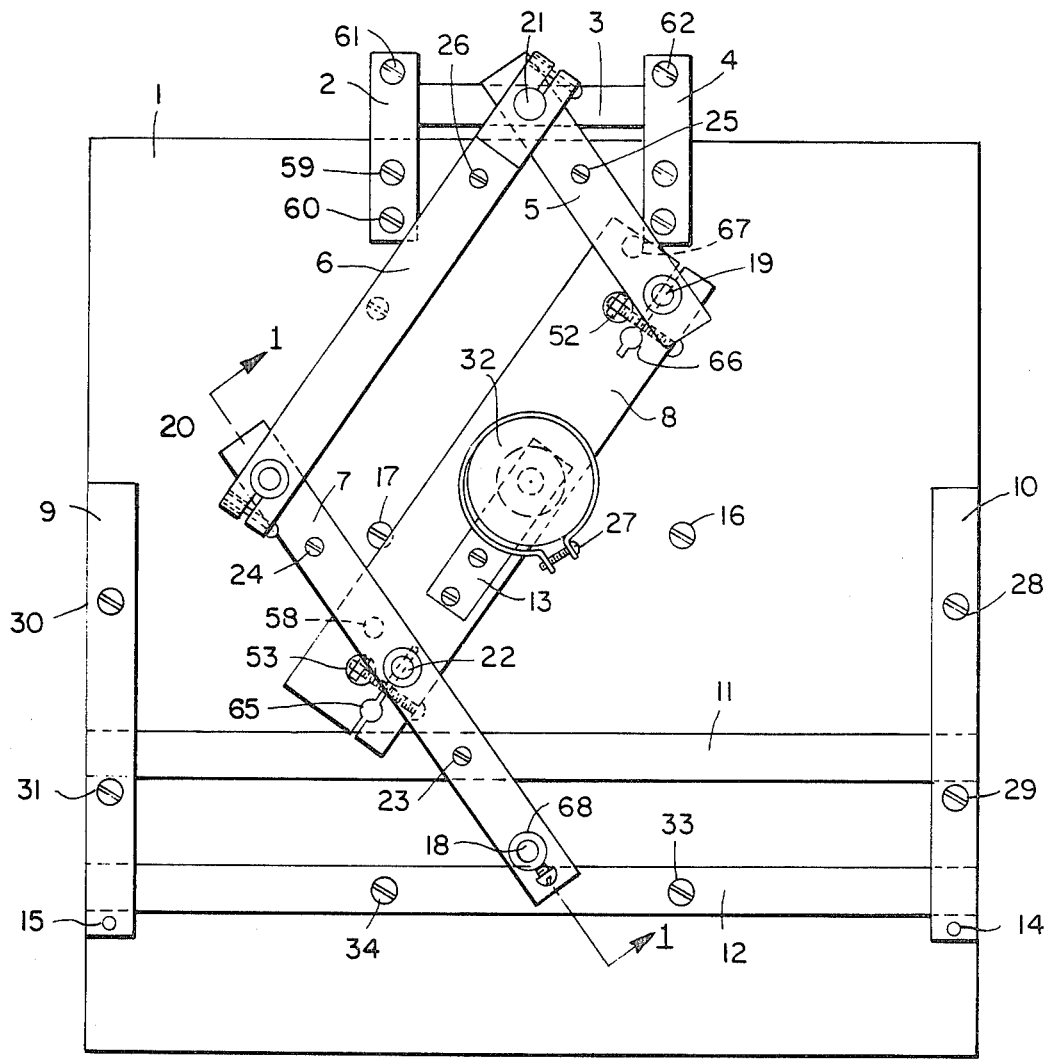
FIG. 1 is a plan view of the engraving machine.

In the drawing 1 represents the base of my engraving machine. As shown in FIG. 2 the base has a flat top surface 56 lying in a single plane for both the pattern and work surfaces. Clamps 9 and 10 are secured to the surface 56 by means of screws 28, 29, 30 and 31, and pins 14 and 15. Other threaded holes such as 16 and 17, together with clamps 9 and 10, serve to clamp patterns and work pieces to the surface 56.

The pantograph assembly consisting of arm assemblies 5, 6, 7, and 8 pivoted on bearing shafts 19, 20, and 22 is mounted on a movable shaft 3 and bearing shaft 21.

To hold the movable shaft 3 in position on the surface 56 and base 1 there are provided mounting blocks 2 and 4. Movable shaft 3 has extended bearing shafts on each end which engage the bearing holes in blocks 2 and 4. Blocks 2 and 4 are mounted to base 1 by screws 42, 43, 59 and 60 and corresponding threaded means only two of which are shown in FIG. 2 at 41 and 44 through oversized holes in the base. The oversized holes allow movement in the plane of the base, between the base and blocks 2 and 4 when the associated mounting screws are loosened. This movement provides adjustment for a precise low friction fit between movable shaft 3 and the mounting blocks 2 and 4. Clamping action of the slotted bearing holes and screws 61 and 62 provides adjustment on the fit and friction of the bearing extension on each end of movable shaft 3 and the bearing holes in blocks 2 and 4.

Clamping blocks 45 and 46 on bearing shaft 21 are provided for vertical adjustment of the pantograph arm assembly above the surface 56.

Bracket 13 and clamp 27 on pantograph arm 8 supply a mounting structure for a work tool 47, on the arm 8. Bracket 48 with threaded grommet 63 are provided to adjust the depth of cut of a working tool into the work surface.

Figure 3:
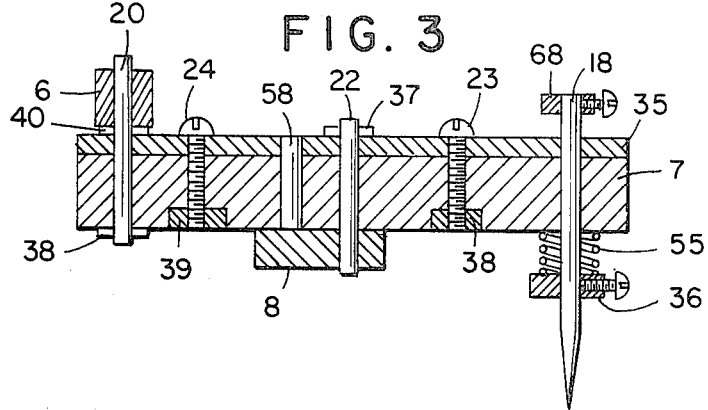
FIG. 3 is a cross-sectional view taken on the line 1-1 of FIG. 1

As shown in FIG. 3, pantograph arm assembly 7 consists of two parts one on top of the other. The larger and major structure 7 has bearing adjustment structure 35 fastened to the major structure 7 by means of screws 23 and 24 with matching threaded holes 38 and 39.

The holes in structure 35 are larger in diameter than the screws 23 and 24 thus permitting the parallel movement of structure 35 in relationship to structure 7. This movement in any direction on the mutual plane between structures 7 and 35 allows adjustment of the effective bearing clearance on one, or any one, of the three bearing shafts 18, 20 and 22. This adjustment is also shown in FIG. 4 a plan view of pantograph arm assembly 5 wherein the upper structure 57 has been displayed vertically, in the plane of the drawing, with structure 5 thus reducing the bearing fit between bearing shafts 19, 21 and 25 and the bearing holes in structures 5 and 57.

The slotted holes and clamping screws 65 and 66 in pantograph arm 8 secure bearing shafts 19 and 22 and permit adjustment of the friction between the mating arm assemblies 5 and 7. Similar slotted holes and clamping screws serve the same purpose in arm assembly 6.

The pattern following stylus 18 rotates and moves linearly in its bearing hole as shown in FIG. 3. Collars 36 and 68 together with compression spring 55 provide adjustable pre-travel of the stylus as it contacts the pattern area.

The relationship and scale of reproduction of the pantograph assembly is varied by the proper selection of holes 58 and 65 and shaft 22 in mating arm assemblies 7 and 8, similarly the selection of holes 66 and 67 in arm assemblies 5 and 8.

It is obvious that the adjustable bearings and locking clamps can be equally effective in either of the mating arm assemblies without departing from the invention herein and reliance is had upon the doctrine of equivalence to cover such obvious expedients.

I claim:

1. In an engraving machine comprising a mounting assembly and a pantograph structure comprising a pantograph frame comprising two pairs of arm members pivotally joined to each other in pantograph form and attached to said mounting assembly, the combination of a joint means for pivotally joining said arm members comprising axially aligned bores in adjoining arm members and a shaft of rigid material extending through and beyond opposite ends of the bores, said shaft secured to one of the respective arms by means of a slotted bore and clamping screw, the mating arm having a bore providing a bearing for said shaft, said mating arm comprising two parts in face to face butting contact along a plane perpindicular to the axis of the bore and shaft, said two parts being joined by screws extending through enlarged holes in one part and engaging threaded holes in the other part thus threaded holes providing means for displacing the two parts in any direction in their mutual planes, said displacement drawing the two parts in snug though moving engagement with the shaft.

2. In an engraving machine according to claim 1 wherein the mounting assembly comprises laterally spaced blocks secured to the base and having bores parallel to the plane of the base, said bores having slots in the plane of the bores and intersecting said bores, screws perpendicular to and thru said slots and means for said screws drawing the opposite sides of the slots together reducing the mean diameter of the bore for snug though moving engagement with a horizontally disposed shaft secured to the pantograph frame and extending through said bores.

3. In an engraving machine according to claim 1 wherein the pantograph arms are of plastic and the shaft of steel.

4. In an engraving machine according to claim 2 wherein the blocks are secured to the base by cooperating oversized hole means and screw means for adjusting the relationship of the blocks to the base.

\* \* \* \* \*